US 12,145,321 B2

(12) United States Patent
Hashizume

(10) Patent No.: US 12,145,321 B2
(45) Date of Patent: Nov. 19, 2024

(54) THREE-DIMENSIONAL SHAPING DEVICE

(71) Applicant: SEIKO EPSON CORPORATION, Tokyo (JP)

(72) Inventor: Keitaro Hashizume, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/088,832

(22) Filed: Dec. 27, 2022

(65) Prior Publication Data
US 2023/0202118 A1 Jun. 29, 2023

(30) Foreign Application Priority Data

Dec. 28, 2021 (JP) ................................. 2021-213938

(51) Int. Cl.
B29C 64/393 (2017.01)
B29C 64/209 (2017.01)
B29C 64/245 (2017.01)
B29C 64/295 (2017.01)
B29C 64/40 (2017.01)
(Continued)

(52) U.S. Cl.
CPC .......... B29C 64/393 (2017.08); B29C 64/209 (2017.08); B29C 64/245 (2017.08); B29C 64/295 (2017.08); B29C 64/40 (2017.08); B33Y 30/00 (2014.12); B33Y 50/02 (2014.12)

(58) Field of Classification Search
CPC ... B29C 64/393; B29C 64/209; B29C 64/245; B29C 64/295; B29C 64/40; B29C 64/386; B29C 64/227; B29C 64/236; B33Y 30/00; B33Y 50/02; B33Y 50/00
See application file for complete search history.

(56) References Cited

U.S. PATENT DOCUMENTS

2007/0196561 A1* 8/2007 Philippi ................ B29C 64/153
118/712
2017/0227408 A1* 8/2017 Helvajian ............... B22F 10/38
(Continued)

FOREIGN PATENT DOCUMENTS

DE 102016120998 A1 * 5/2018
JP 2021-041661 A 3/2021
WO WO-2017030586 A1 * 2/2017 ........... B29C 64/165

Primary Examiner — Seyed Masoud Malekzadeh
Assistant Examiner — Vipul Malik
(74) Attorney, Agent, or Firm — Harness, Dickey & Pierce, P.L.C.

(57) ABSTRACT

A three-dimensional shaping device includes a stage, a heater, a head dispensing a shaping material toward the stage to form a shaping layer, a thermal sensor measuring a temperature of a measurement region of the shaping layer, an actuator moving the stage, the thermal sensor, and/or the head relative to each other, and a processor. The processor sets the measurement region being a point. The point has the lowest heat dissipation property within the shaping layer. The processor causes the head to dispense the shaping material to form another shaping layer when the processor determines that the measured temperature is equal to or lower than the predetermined value and repeats the measurement and the determination if the processor determines that the measured temperature is higher than the predetermined value until the processor determines that the measured temperature is equal to or lower than the predetermined value.

3 Claims, 7 Drawing Sheets

(51) Int. Cl.
*B33Y 30/00* (2015.01)
*B33Y 50/02* (2015.01)

(56) References Cited

U.S. PATENT DOCUMENTS

| | | | |
|---|---|---|---|
| 2020/0269491 A1* | 8/2020 | Fujimori | B29C 64/393 |
| 2020/0290277 A1* | 9/2020 | Fujii | B29C 64/118 |
| 2021/0078242 A1 | 3/2021 | Anegawa et al. | |
| 2021/0354201 A1* | 11/2021 | Barnes | B33Y 30/00 |
| 2021/0387401 A1* | 12/2021 | Rumjahn | B29C 64/295 |
| 2023/0201928 A1* | 6/2023 | Bullard | B33Y 10/00 |
| | | | 148/212 |

\* cited by examiner

THREE-DIMENSIONAL SHAPING DEVICE

The present application is based on, and claims priority from JP Application Serial Number 2021-213938, filed Dec. 28, 2021, the disclosure of which is hereby incorporated by reference herein in its entirety.

BACKGROUND

1. Technical Field

The present disclosure relates to a three-dimensional shaping device.

2. Related Art

There is known a three-dimensional shaping device that shapes a three-dimensional shaped object by dispensing a melted material from a nozzle, depositing and curing the material.

The three-dimensional shaped object is formed by laminating a plurality of shaping layers. When a second shaping layer is formed on a first shaping layer, if the second shaping layer is not formed after a temperature of the first shaping layer is sufficiently lowered, a shape of the first shaping layer may collapse when the second shaping layer is formed.

For example, JP-A-2021-41661 describes a three-dimensional shaping device that measures a temperature of a formed first shaping layer by a measurement unit before forming a second shaping layer.

However, in the three-dimensional shaping device as described above, the temperature varies in an in-plane direction of the first shaping layer depending on a shape of the first shaping layer. Therefore, even when the temperature measured by the measurement unit reaches a target temperature, there may be a region in which the temperature does not reach the target temperature in the first shaping layer.

SUMMARY

One aspect of a three-dimensional shaping device according to the present disclosure includes:
a stage;
a heater covering a shaping region of the stage and facing the stage;
a head configured to dispense a shaping material toward the stage to form a shaping layer;
a sensor configured to measure a temperature of a measurement region of the shaping layer;
a movement mechanism configured to move the stage and the sensor relative to each other and move the stage and the head relative to each other; and
a control unit configured to control the head and the movement mechanism, in which
the control unit is configured to execute processing of
setting the measurement region based on information on a shape of the shaping layer,
causing the sensor to measure a temperature of the measurement region, and
controlling the head and the movement mechanism to dispense the shaping material from the head toward the shaping layer when the measured temperature of the measurement region is equal to or lower than a predetermined value.

DESCRIPTION OF EXEMPLARY EMBODIMENTS

Hereinafter, preferred embodiments of the present disclosure will be described in detail with reference to the drawings. The embodiments to be described below do not unduly limit contents of the present disclosure described in the claims. In addition, not all configurations to be described below are necessarily essential components of the present disclosure.

1. Three-Dimensional Shaping Device
1.1. Overall Configuration

Figure 1:
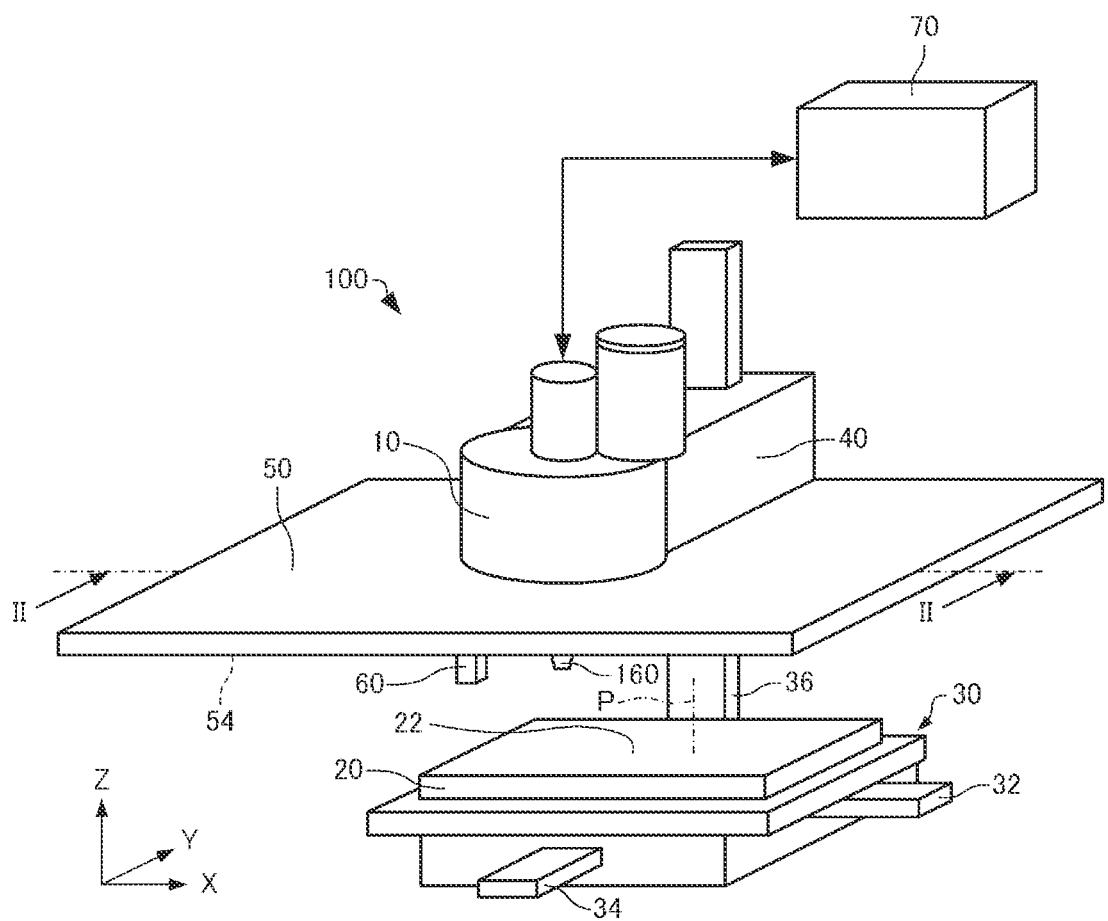
FIG. 1 is a side view schematically showing a three-dimensional shaping device according to an embodiment.
Figure 2:
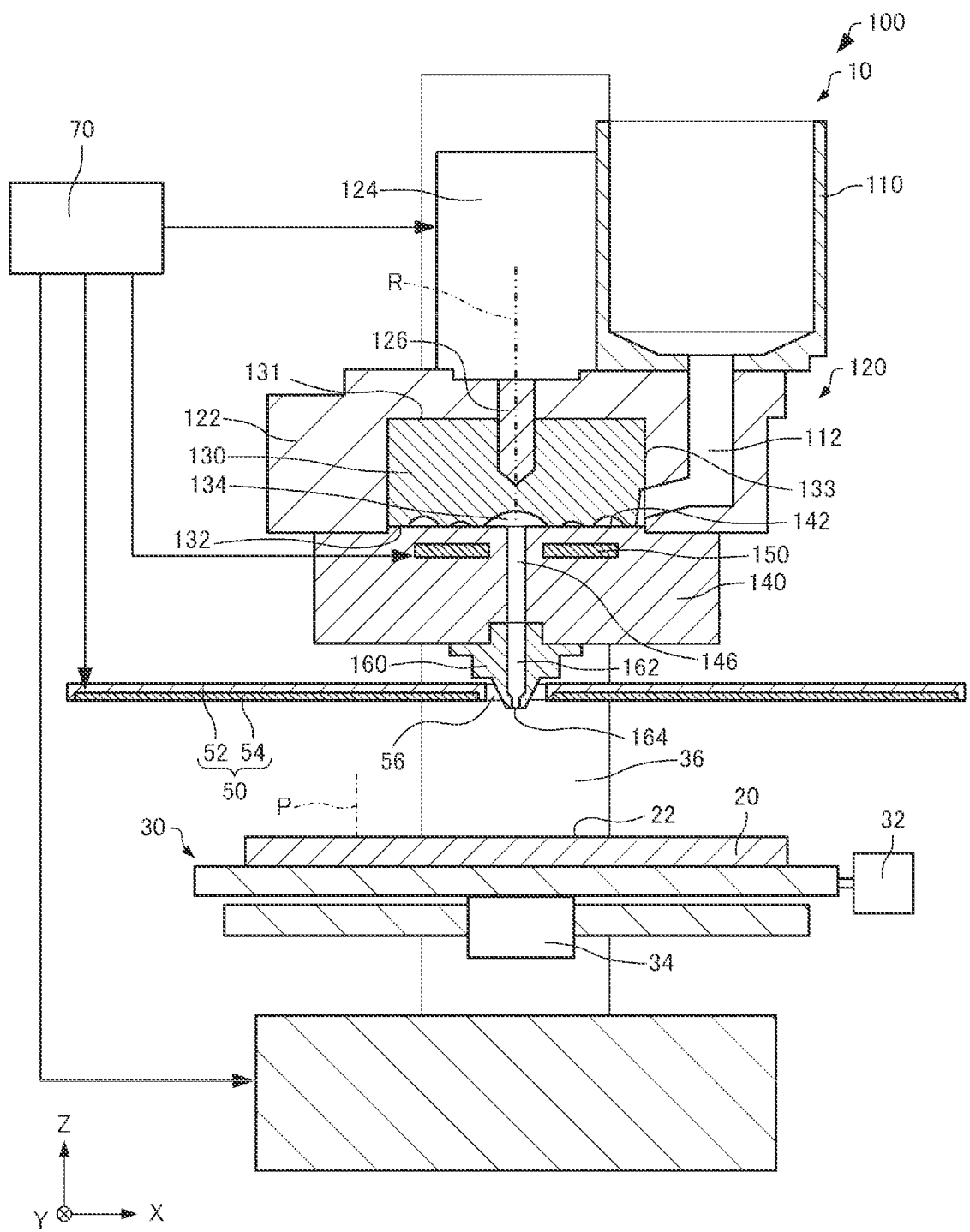
FIG. 2 is a cross-sectional view schematically showing the three-dimensional shaping device according to the present embodiment.

First, a three-dimensional shaping device according to the present embodiment will be described with reference to the drawings. FIG. 1 is a perspective view schematically showing a three-dimensional shaping device 100 according to the present embodiment. FIG. 2 is a cross-sectional view taken along a line II-II of FIG. 1 schematically showing the three-dimensional shaping device 100 according to the present embodiment. In FIGS. 1 and 2, an X-axis, a Y-axis, and a Z-axis are shown as three axes orthogonal to each other. The X-axis direction and the Y-axis direction are, for example, horizontal directions. The Z-axis direction is, for example, a vertical direction.

As shown in FIGS. 1 and 2, the three-dimensional shaping device 100 includes, for example, a head 10, a stage 20, a movement mechanism 30, a support member 40, a heating mechanism 50, a sensor 60, and a control unit 70.

The three-dimensional shaping device 100 drives the movement mechanism 30 to change a relative position between the head 10 and the stage 20 while dispensing a plasticized shaping material from the head 10 toward the stage 20. Accordingly, the three-dimensional shaping device 100 shapes a three-dimensional shaped object having a desired shape on the stage 20.

For example, as shown in FIG. 2, the head 10 includes a material supply unit 110, a plasticizing unit 120, and a nozzle 160. The head 10 dispenses the shaping material toward a shaping region 22 of the stage 20.

A material in a form of pellets or powder is charged into the material supply unit 110. The material supply unit 110 supplies, to the plasticizing unit 120, the material serving as a raw material. The material supply unit 110 is implemented by, for example, a hopper. The material supplied by the material supply unit 110 is, for example, an acrylonitrile butadiene styrene (ABS) resin.

The material supply unit 110 and the plasticizing unit 120 are coupled by a supply path 112 provided below the material supply unit 110. The material supplied to the material supply unit 110 is supplied to the plasticizing unit 120 via the supply path 112.

As shown in FIG. 2, the plasticizing unit 120 includes, for example, a screw case 122, a drive motor 124, a flat screw 130, a barrel 140, and a heater 150. The plasticizing unit 120 plasticizes the material in a solid state supplied from the material supply unit 110, generates a paste-like shaping material having fluidity, and supplies the paste-like shaping material to the nozzle 160.

The term "plasticize" is a concept including melting, and means changing from a solid state to a flowable state. Specifically, for a material in which glass transition occurs, the "plasticize" refers to setting a temperature of the material to be equal to or higher than a glass transition point. For a material in which glass transition does not occur, the "plasticize" refers to setting the temperature of the material to be equal to or higher than a melting point.

The screw case 122 is a housing that houses the flat screw 130. The barrel 140 is provided on a lower surface of the screw case 122. The flat screw 130 is housed in a space surrounded by the screw case 122 and the barrel 140.

The drive motor 124 is provided on an upper surface of the screw case 122. The drive motor 124 is, for example, a servomotor. A shaft 126 of the drive motor 124 is coupled to an upper surface 131 of the flat screw 130. The drive motor 124 is controlled by the control unit 70. Although not shown, the shaft 126 of the drive motor 124 and the upper surface 131 of the flat screw 130 may be coupled to each other via a speed reducer.

The flat screw 130 has a substantially cylindrical shape in which a size in a direction of a rotation axis R is smaller than a size in a direction orthogonal to the direction of the rotation axis R. In the illustrated example, the rotation axis R is parallel to the Z-axis. The flat screw 130 is rotated about the rotation axis R by a torque generated by the drive motor 124.

Figure 3:
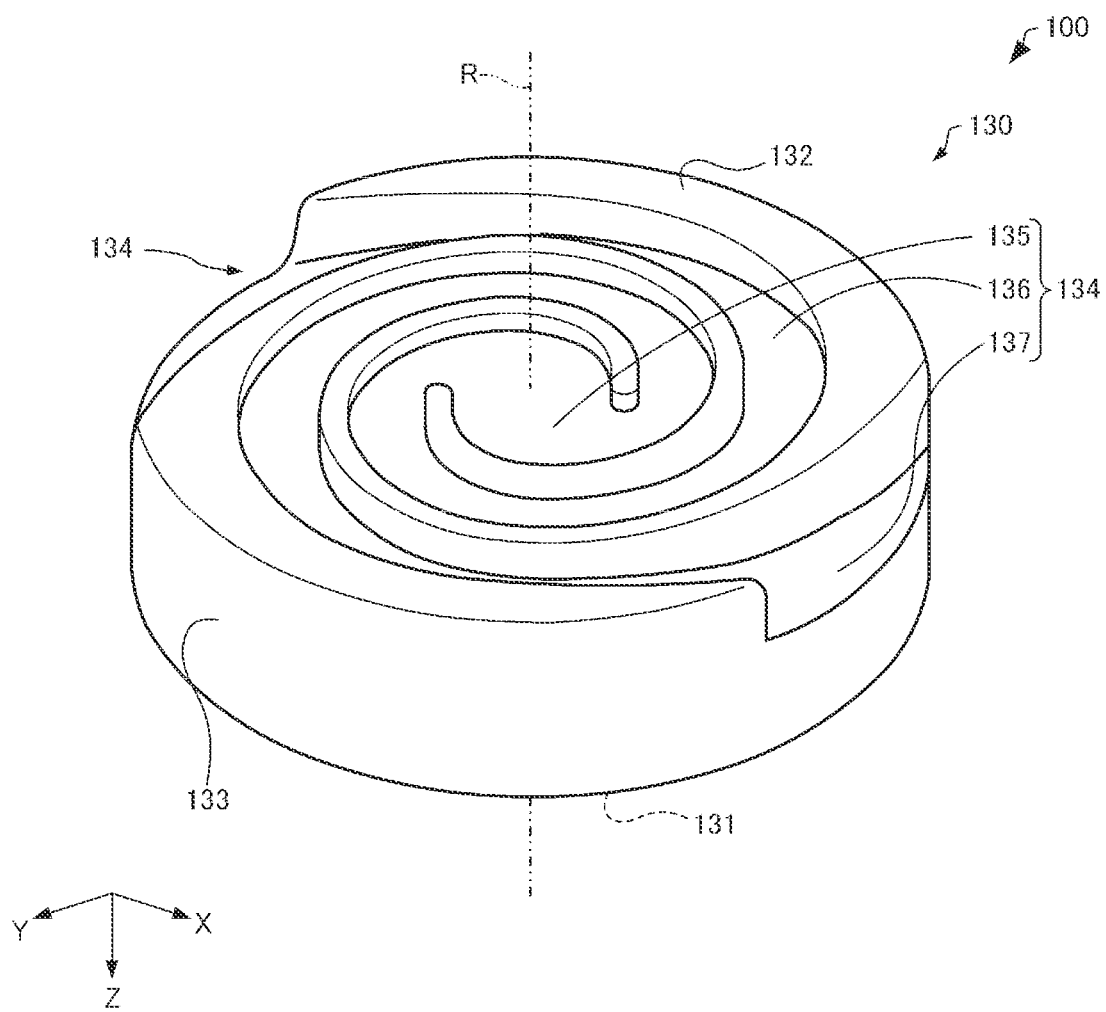
FIG. 3 is a perspective view schematically showing a flat screw of the three-dimensional shaping device according to the present embodiment.

The flat screw 130 has the upper surface 131, a groove forming surface 132 opposite to the upper surface 131, and a side surface 133 coupling the upper surface 131 and the groove forming surface 132. A first groove 134 is formed in the groove forming surface 132. The side surface 133 is, for example, perpendicular to the groove forming surface 132. Here, FIG. 3 is a perspective view schematically showing the flat screw 130. For convenience, FIG. 3 shows a state in which an up-down positional relationship is reversed from a state shown in FIG. 2.

As shown in FIG. 3, the first groove 134 is formed in the groove forming surface 132 of the flat screw 130. The first groove 134 includes, for example, a central portion 135, a coupling portion 136, and a material introduction portion 137. The central portion 135 faces a communication hole 146 formed in the barrel 140. The central portion 135 communicates with the communication hole 146. The coupling portion 136 couples the central portion 135 and the material introduction portion 137. In the illustrated example, the coupling portion 136 is provided in a spiral shape from the central portion 135 toward an outer periphery of the groove forming surface 132. The material introduction portion 137 is provided on the outer periphery of the groove forming surface 132. That is, the material introduction portion 137 is provided on the side surface 133 of the flat screw 130. The material supplied from the material supply unit 110 is introduced from the material introduction portion 137 into the first groove 134, passes through the coupling portion 136 and the central portion 135, and is conveyed to the communication hole 146 formed in the barrel 140. For example, two first grooves 134 are provided.

The number of the first grooves 134 is not particularly limited. Although not shown, three or more first grooves 134 may be provided, or only one first groove 134 may be provided. In addition, although not shown, the three-dimensional shaping device 100 may include an in-line screw instead of the flat screw 130.

As shown in FIG. 2, the barrel 140 is provided below the flat screw 130. The barrel 140 has a facing surface 142 facing the groove forming surface 132 of the flat screw 130. The communication hole 146 communicating with the first groove 134 is formed in the center of the facing surface 142. Here, FIG. 4 is a plan view schematically showing the barrel 140.

Figure 4:
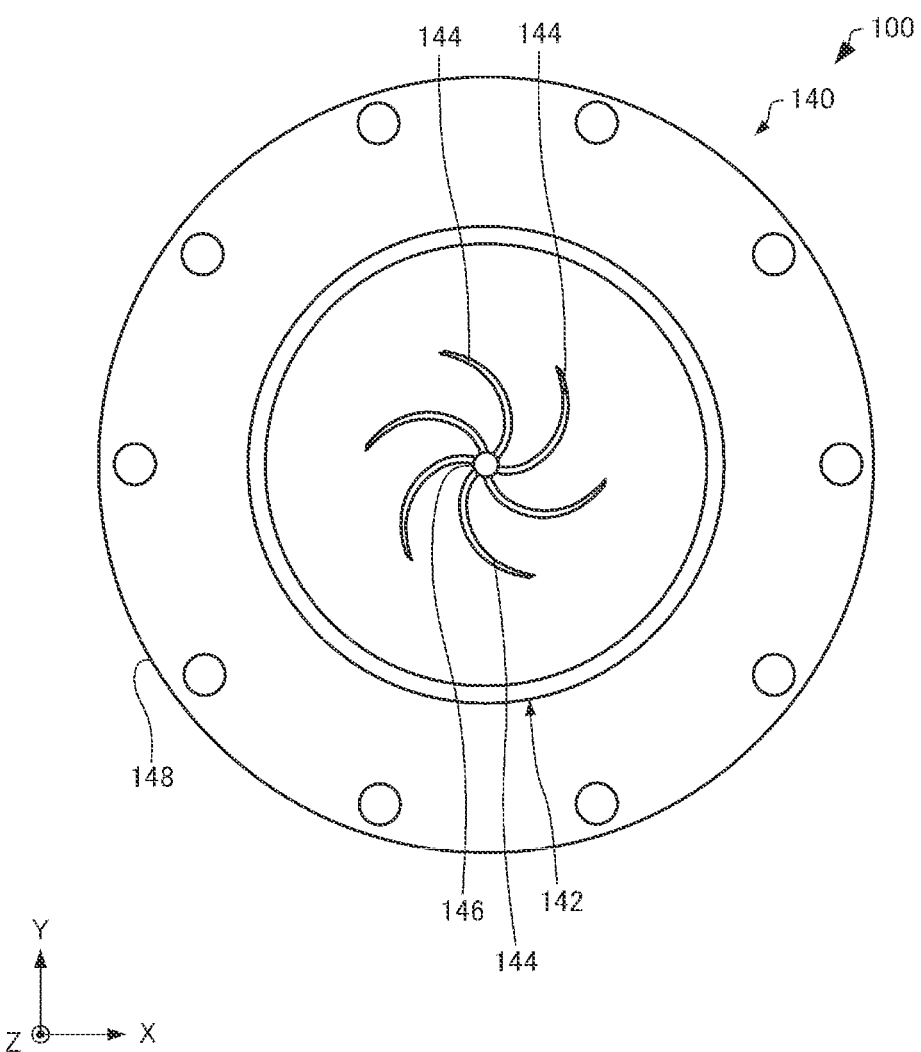
FIG. 4 is a plan view schematically showing a barrel of the three-dimensional shaping device according to the present embodiment.

As shown in FIG. 4, a second groove 144 and the communication hole 146 are formed in the facing surface 142 of the barrel 140. A plurality of the second grooves 144 are formed. In the illustrated example, six second grooves 144 are formed, and the number of the second grooves 144 is not particularly limited. The plurality of second grooves 144 are formed around the communication hole 146 when viewed from the Z-axis direction. One end of the second groove 144 is coupled to the communication hole 146, and the second grooves 144 extend spirally from the communication hole 146 toward an outer periphery 148 of the barrel 140. The second grooves 144 have a function of guiding the plasticized material to the communication hole 146.

A shape of the second groove 144 is not particularly limited, and may be, for example, a linear shape. In addition, one end of the second groove 144 may not be coupled to the communication hole 146. Further, the second groove 144 may not be formed in the facing surface 142. In consideration of efficiently guiding the plasticized material to the communication hole 146, the second groove 144 is preferably formed in the facing surface 142.

As shown in FIG. 2, the heater 150 is provided in the barrel 140. The heater 150 heats the material supplied between the flat screw 130 and the barrel 140. The output of the heater 150 is controlled by the control unit 70. The plasticizing unit 120 generates the plasticized shaping material by heating the shaping material while conveying the shaping material toward the communication hole 146 by using the flat screw 130, the barrel 140, and the heater 150, and causes the generated shaping material to flow out from the communication hole 146. Although not shown, a shape of the heater 150 may be a ring shape when viewed from the Z-axis direction.

The nozzle 160 is provided below the barrel 140. The nozzle 160 dispenses the material supplied from the plasticizing unit 120 toward the stage 20. A nozzle flow path 162 is formed in the nozzle 160. The nozzle flow path 162 communicates with the communication hole 146. The nozzle flow path 162 has a nozzle opening 164. The nozzle opening 164 is positioned at a front end of the nozzle 160.

The material supplied from the communication hole 146 passes through the nozzle flow path 162 and is dispensed from the nozzle opening 164.

As shown in FIGS. 1 and 2, the stage 20 is provided below the nozzle 160. In the illustrated example, a shape of the stage 20 is a rectangular parallelepiped. The stage 20 has the shaping region 22. The shaping material is dispensed from the head 10 to the shaping region 22. The shaping region 22 is a region on an upper surface of the stage 20. The shaping region 22 is defined by a position of the nozzle opening 164 of the head 10. For example, when the stage 20 is moved in the X-axis direction and the Y-axis direction by the movement mechanism 30, an end of the shaping region 22 in the −X-axis direction is positioned below the nozzle opening 164 when the stage 20 is moved most in the +X-axis direction. An end of the shaping region 22 in the +X-axis direction is positioned below the nozzle opening 164 when the stage 20 is moved most in the −X-axis direction.

The movement mechanism 30 supports the stage 20. The movement mechanism 30 moves the stage 20 and the head 10 relative to each other. Further, the movement mechanism 30 moves the stage 20 and the heating mechanism 50 relative to each other. The heating mechanism 50 is moved, for example, in accordance with the movement of the head 10. In the illustrated example, the movement mechanism 30 moves the stage 20 in the X-axis direction and the Y-axis direction to change the relative positions between the stage 20 and the head 10, the heating mechanism 50 in the X-axis direction and the Y-axis direction. Further, the movement mechanism 30 moves the head 10 and the heating mechanism 50 in the Z-axis direction to change the relative positions between the stage 20 and the head 10, the heating mechanism 50 in the Z-axis direction.

The movement mechanism 30 includes, for example, a first electric actuator 32, a second electric actuator 34, and a third electric actuator 36. The first electric actuator 32 moves the stage 20 in the X-axis direction. The second electric actuator 34 moves the stage 20 in the Y-axis direction. The third electric actuator 36 moves the head 10 and the heating mechanism 50 in the Z-axis direction.

The support member 40 is coupled to the third electric actuator 36. In the illustrated example, the support member 40 extends in the −Y-axis direction from the third electric actuator 36. The support member 40 supports the head 10 and the heating mechanism 50. The movement mechanism 30 moves the head 10 and the heating mechanism 50 in the Z-axis direction by moving the support member 40 in the Z-axis direction using the third electric actuator 36.

A shape of the heating mechanism 50 is, for example, a substantially plate shape. The heating mechanism 50 includes, for example, a support plate 52 and a heater 54. The heater 54 is supported by the support plate 52. The heater 54 covers the shaping region 22 of the stage 20. The heater 54 faces the stage 20. When viewed from the Z-axis direction, the stage 20 is provided, for example, on an inner side of an outer edge of the heater 54. The heater 54 heats a shaping layer made of the shaping material deposited in the shaping region 22. The heater 54 can heat the entire shaping region 22. The output of the heater 54 is controlled by the control unit 70.

As shown in FIG. 2, a through hole 56 is formed in the heating mechanism 50. In the illustrated example, the through hole 56 penetrates the heating mechanism 50 in the Z-axis direction. The nozzle 160 is positioned in the through hole 56. In the illustrated example, the flat screw 130 and the barrel 140 are positioned in the +Z-axis direction of the heating mechanism 50, and the nozzle opening 164 and the stage 20 are positioned in the −Z-axis direction of the heating mechanism 50.

The shape of the heating mechanism 50 is not particularly limited as long as the heater 54 can heat the shaping region 22. For example, the three-dimensional shaping device 100 may include a chamber (not shown) that houses the head 10, the stage 20, and the movement mechanism 30, and the heating mechanism 50 may heat the shaping region 22 by heating the entire chamber.

As shown in FIG. 1, the sensor 60 is fixed to the heating mechanism 50. Therefore, the sensor 60 is moved in accordance with the movement of the heating mechanism 50. That is, the movement mechanism 30 moves the stage 20 and the sensor 60 relative to each other. The sensor 60 is fixed to, for example, an outer peripheral end portion of the support plate 52 of the heating mechanism 50. The sensor 60 protrudes from the support plate 52 in the −Z-axis direction. The sensor 60 measures a temperature of a measurement region of the shaping layer formed on the stage 20. The temperature measured by the sensor 60 is transmitted to the control unit 70. The sensor 60 is, for example, a non-contact radiation thermometer that radiates infrared rays or the like.

The control unit 70 is implemented by, for example, a computer including a processor, a main storage device, and an input and output interface that receives and outputs a signal from and to the outside. The control unit 70 exerts various functions, for example, by the processor executing a program read into the main storage device. Specifically, the control unit 70 controls the head 10, the movement mechanism 30, and the heating mechanism 50. The control unit 70 may include a combination of a plurality of circuits instead of the computer.

1.2. Processing of Control Unit

Figure 5:
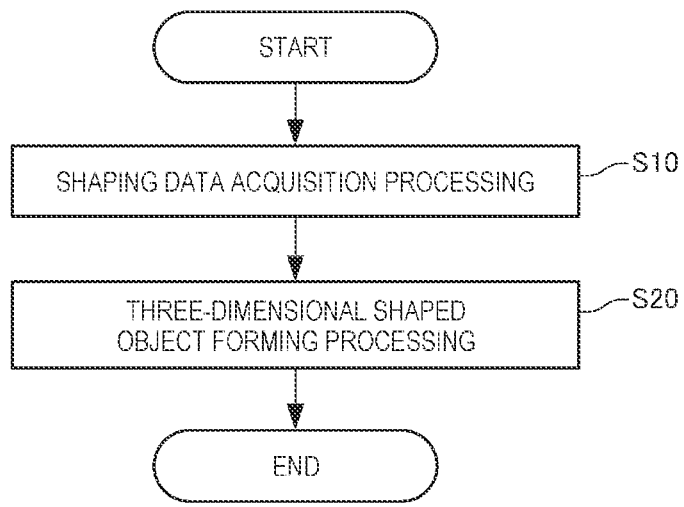
FIG. 5 is a flowchart showing processing of a control unit of the three-dimensional shaping device according to the present embodiment.

FIG. 5 is a flowchart showing processing of the control unit 70. For example, the user operates an operation unit (not shown) to output, to the control unit 70, a processing start signal for starting the processing. The operation unit includes, for example, a mouse, a keyboard, and a touch panel. When the processing start signal is received, the control unit 70 starts the processing. Hereinafter, each processing will be described.

1.2.1. Shaping Data Acquisition Processing

First, as shown in FIG. 5, the control unit 70 performs shaping data acquisition processing of acquiring shaping data for shaping a three-dimensional shaped object (step S10).

The shaping data is created by, for example, causing a slicer software, which is installed in a computer coupled to the three-dimensional shaping device 100, to read shape data. The shape data is data representing a target shape of the three-dimensional shaped object created using three-dimensional computer aided design (CAD) software, three-dimensional computer graphics (CG) software, and the like. As the shape data, for example, data in a standard triangulated language (STL) format, an additive manufacturing file format (AMF), and the like is used. The slicer software divides the target shape of the three-dimensional shaped object into layers each having a predetermined thickness, and creates shaping data for each layer. The shaping data is represented by a G code or the like.

The shaping data includes, for example, information on a movement path of the nozzle 160 with respect to the stage 20, an amount of the shaping material dispensed from the nozzle 160, a shape and an area of each of the plurality of shaping layers forming the three-dimensional shaped object, and the like. The "shape and area of the shaping layer" are the shape and area of the shaping layer when viewed from a direction of a perpendicular line P of the shaping region 22. In the example illustrated in FIGS. 1 and 2, the perpendicular line P is parallel to the Z-axis. The control unit 70 acquires the shaping data from the computer coupled to the three-dimensional shaping device 100 or a recording medium such as a universal serial bus (USB) memory.

1.2.2. Three-Dimensional Shaped Object Forming Processing

Next, as shown in FIG. 5, the control unit 70 performs three-dimensional shaped object forming processing of forming the three-dimensional shaped object on the stage 20 (step S20).

Specifically, the control unit 70 plasticizes the material supplied between the flat screw 130 and the barrel 140 to generate the shaping material, and dispenses the shaping material from the nozzle 160. For example, the control unit 70 continues to generate the shaping material until the three-dimensional shaped object forming processing is completed. Further, the control unit 70 drives the heater 54. For example, the control unit 70 continues to drive the heater 54 until the three-dimensional shaped object forming processing is completed. Here, FIG. 6 is a cross-sectional view showing the three-dimensional shaped object forming processing.

Figure 6:
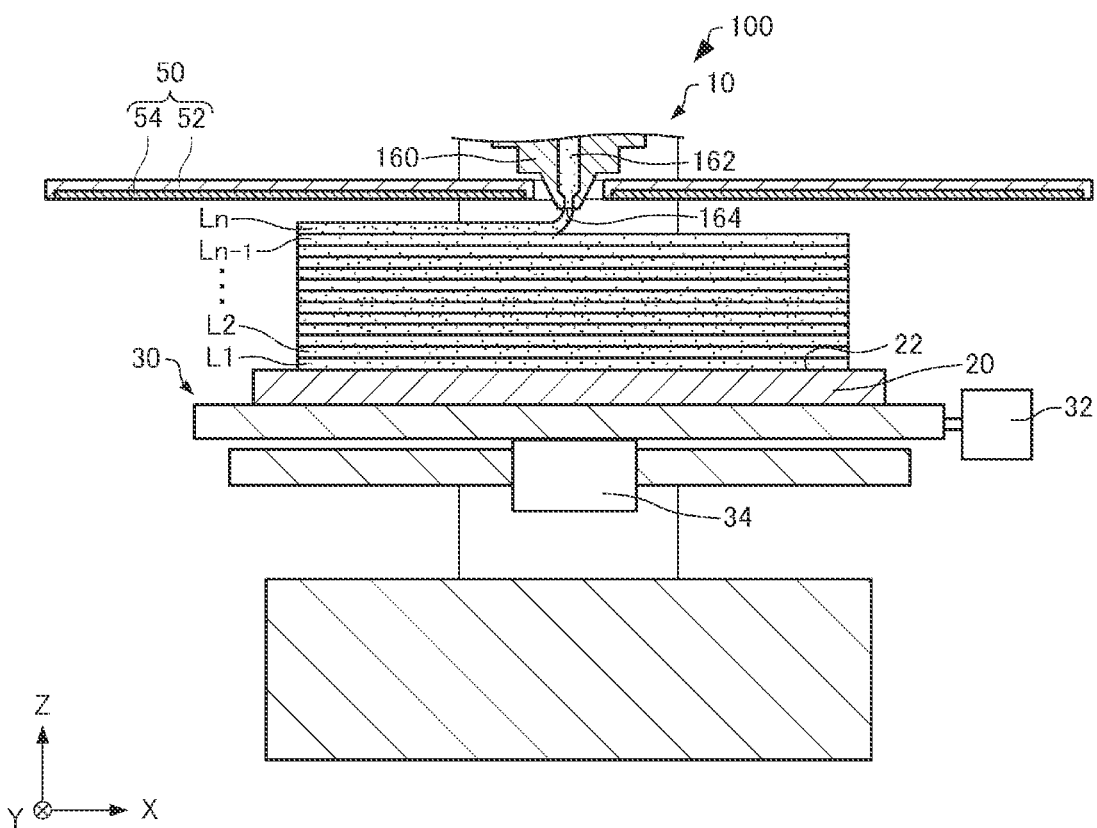
FIG. 6 is a cross-sectional view showing three-dimensional shaped object forming processing of the three-dimensional shaping device according to the present embodiment.

As shown in FIG. 6, the control unit 70 controls the head 10 to dispense the shaping material from the nozzle 160 toward the stage 20 while controlling the movement mechanism 30 to change the relative position between the nozzle 160 and the stage 20 based on the acquired shaping data.

Specifically, before the three-dimensional shaped object forming processing is started, that is, before formation of a shaping layer L1 which is a first shaping layer is started, the nozzle 160 is disposed at an initial position in the −X-axis direction with respect to an end portion of the stage 20 in the −X-axis direction. When the three-dimensional shaped object forming processing is started, as shown in FIG. 6, the control unit 70 controls the movement mechanism 30 to move, for example, the nozzle 160 in the +X-axis direction relative to the stage 20. When the nozzle 160 passes over the stage 20, the shaping material is dispensed from the nozzle 160. Accordingly, the shaping layer L1 is formed. In FIG. 6, n is any natural number, and the shaping layers up to the n-th shaping layer Ln are shown.

Figure 7:
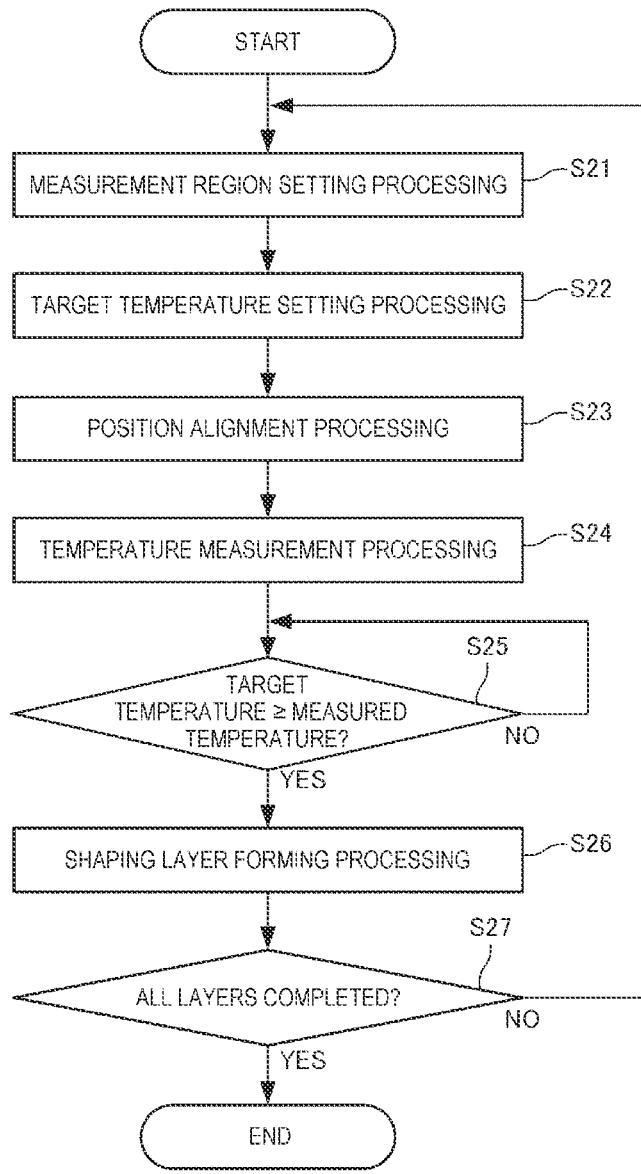
FIG. 7 is a flowchart showing processing of the control unit of the three-dimensional shaping device according to the present embodiment.

Here, FIG. 7 is a flowchart showing the three-dimensional shaped object forming processing of the control unit 70 in more detail.

In the three-dimensional shaped object forming processing, as shown in FIG. 7, the control unit 70 performs measurement region setting processing of setting a measurement region M of a shaping layer Ln−1 based on information on a shape and an area of the (n−1)th shaping layer Ln−1 included in the shaping data (step S21). Specifically, the control unit 70 sets a position of the measurement region M of the shaping layer Ln−1 based on the information on the shape and the area of the shaping layer Ln−1 included in the shaping data. The measurement region M is a region measured by the sensor 60.

The control unit 70 may calculate and set the position of the measurement region M based on the information on the shape and the area of the shaping layer Ln−1 included in the shaping data, or when the shaping data includes the information on the position of the measurement region M calculated based on the information on the shape and the area of the shaping layer Ln−1, the control unit 70 may directly acquire the information on the position of the measurement region M from the shaping data and set the position of the measurement region M.

Next, the control unit 70 performs target temperature setting processing of setting a target temperature of the measurement region M based on the information on the shape and the area of the shaping layer Ln−1 (step S22). The target temperature is a temperature at which the shaping layer Ln−1 is cured.

The control unit 70 may calculate and set the target temperature based on the information on the shape and the area of the shaping layer Ln−1 included in the shaping data, or when the shaping data includes the information on the target temperature calculated based on the information on the shape and the area of the shaping layer Ln−1, the control unit 70 may directly acquire the information on the target temperature from the shaping data and set the target temperature.

Next, the control unit 70 controls the movement mechanism 30 to move the stage 20 and the sensor 60 relative to each other, and performs position alignment processing of aligning the position of the sensor 60 with the position of the measurement region M (step S23). Specifically, the control unit 70 controls the movement mechanism 30 to overlap the sensor 60 and the measurement region M when viewed from the Z-axis direction. The control unit 70 may align the position of the sensor 60 with the position of the measurement region M by moving the stage 20, or may align the position of the sensor 60 with the position of the measurement region M by moving the sensor 60.

Next, the control unit 70 performs temperature measurement processing of causing the sensor 60 to measure the temperature of the measurement region M (step S24). Specifically, the control unit 70 drives the sensor 60 to cause the sensor 60 to measure the temperature of the measurement region M.

Next, the control unit 70 performs determination processing of determining whether the measured temperature of the measurement region M is equal to or less than a predetermined value (step S25). The "predetermined value" is the target temperature set in step S22.

When it is determined that the measured temperature of the measurement region M is not equal to or lower than the target temperature ("NO" in step S25), the control unit 70 repeats the processing of step S25 until it is determined that the temperature of the measurement region M measured in the processing of step S24 is equal to or lower than the target temperature.

On the other hand, when it is determined that the measured temperature of the measurement region M is equal to or lower than the target temperature ("YES" in step S25), the control unit 70 controls the head 10 and the movement mechanism 30 based on the shaping data to perform shaping layer forming processing of causing the head 10 to dispense the shaping material and forming the shaping layer Ln on the shaping layer Ln−1 (step S26). When the first shaping layer L1 is formed, the control unit 70 omits the processing of steps S21 to S25 and performs the processing of steps S26 and S27.

Next, the control unit 70 performs determination processing of determining whether the formation of all the shaping layers is completed based on the shaping data (step S27).

When it is determined that the formation of all the shaping layers is not completed ("NO" in step S27), the control unit 70 returns the processing to step S21. On the other hand, when it is determined that the formation of all the shaping layers is completed ("YES" in step S27), the control unit 70 ends the processing.

1.3. Measurement Region

Figure 8:
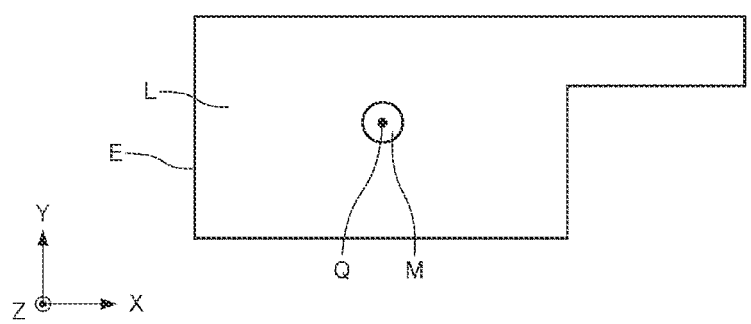
FIG. 8 is a plan view schematically showing a shaping layer formed by the three-dimensional shaping device according to the present embodiment.

FIG. 8 is a plan view schematically showing a shaping layer L formed by the three-dimensional shaping device 100.

As shown in FIG. 8, the shaping layer L has, for example, a shape in which two rectangles are coupled when viewed from the Z-axis direction. A shape of the measurement region M is, for example, a circle. A diameter of the measurement region M is, for example, about 0.6 mm. When the sensor 60 is a radiation thermometer that radiates infrared rays, the measurement region M is a region irradiated with the infrared rays from the radiation thermometer.

The measurement region M does not include an outer edge E of the shaping layer L when viewed from the Z-axis direction. The measurement region M is separated from the outer edge E. The measurement region M includes a point Q. The point Q is a point at which a temperature of the shaping layer L is most unlikely to decrease when viewed from the Z-axis direction. The point Q is a point having the lowest heat dissipation property in the shaping layer L when viewed from the Z-axis direction. In the illustrated example, the point Q is a point at which the shortest distance from the outer edge E of the shaping layer L is the largest when viewed from the Z-axis direction.

1.4. Function and Effect

In the three-dimensional shaping device 100, the control unit 70 performs the processing of setting the measurement region M based on the information on the shape of the shaping layer L, the processing of causing the sensor 60 to measure the temperature of the measurement region M, and the processing of controlling the head 10 and the movement mechanism 30 to dispense the shaping material from the head 10 when the measured temperature of the measurement region M is equal to or less than the predetermined value.

Therefore, in the three-dimensional shaping device 100, it is possible to set, as the measurement region M, a region including the point Q at which the temperature of the shaping layer L is most unlikely to decrease, based on the information on the shape of the shaping layer L. Therefore, in the three-dimensional shaping device 100, the temperature of the entire shaping layer L can be lowered to the target temperature. As a result, even when the shaping material is dispensed onto the shaping layer L, it is possible to reduce the possibility that the shape of the shaping layer L collapses.

In the three-dimensional shaping device 100, the measurement region M does not include the outer edge E of the shaping layer L when viewed from the Z-axis direction. The outer edge E has a heat dissipation property higher than a portion inside the outer edge E of the shaping layer L. Therefore, it is possible to measure the temperature of the measurement region M in which the temperature is unlikely to decrease.

In the three-dimensional shaping device 100, the measurement region M includes the point Q at which the shortest distance from the outer edge E of the shaping layer L is the largest when viewed from the Z-axis direction. The point Q at which the shortest distance from the outer edge E of the shaping layer L is the largest is a point at which the temperature of the shaping layer L is most unlikely to decrease. Therefore, it is possible to measure the temperature of the measurement region M in which the temperature is unlikely to decrease.

2. Modification

2.1. First Modification

Figure 9:
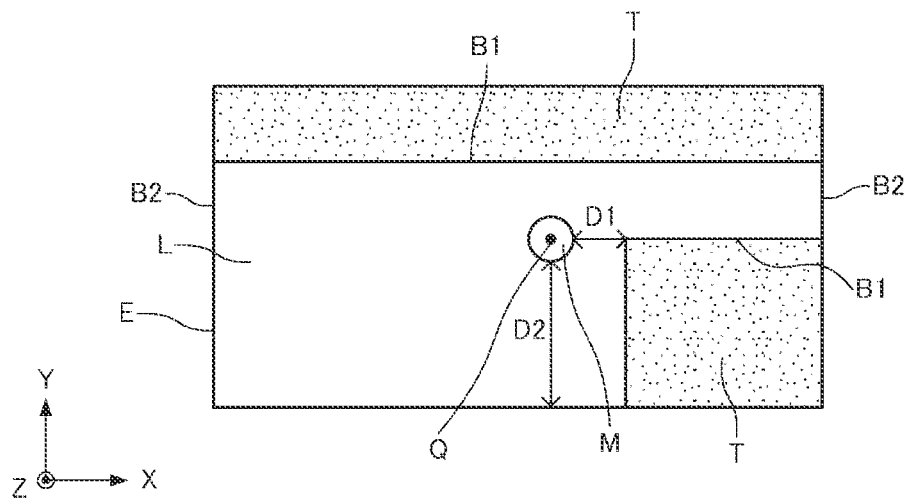
FIG. 9 is a plan view schematically showing a shaping layer formed by a three-dimensional shaping device according to a first modification of the present embodiment.

Next, a three-dimensional shaping device according to a first modification of the present embodiment will be described with reference to the drawings. FIG. 9 is a plan view schematically showing the shaping layer L formed by the three-dimensional shaping device according to the first modification of the present embodiment.

Hereinafter, in the three-dimensional shaping device according to the first modification of the present embodiment, points different from the example of the three-dimensional shaping device 100 according to the present embodiment described above will be described, and description of the same points will be omitted. The same applies to the three-dimensional shaping device according to second to fourth modifications of the present embodiment described later.

As shown in FIG. 9, the shaping layer L formed by the three-dimensional shaping device according to the first modification of the present embodiment is different from the shaping layer L formed by the three-dimensional shaping device 100 described above in that the shaping layer L is supported by a support layer T. A thermal conductivity of a material forming the support layer T in the first modification is equal to or less than a thermal conductivity of a material forming the shaping layer L in the first modification.

The head 10 dispenses a support material toward the stage 20 to form the support layer T. The support material forming the support layer T is, for example, a material of a different type from the shaping material forming the shaping layer L. The support layer T is separated from the shaping layer L, and a three-dimensional shaped object having a desired shape is acquired. In the illustrated example, two support layers T are formed for one shaping layer L.

When viewed from the Z-axis direction, the outer edge E of the shaping layer L includes a first edge B1 that is in contact with the support layer T and a second edge B2 that is not in contact with the support layer T. In the illustrated example, the outer edge E includes two first edges B1 and two second edges B2. A shortest distance D1 between the measurement region M and the first edge B1 is smaller than a shortest distance D2 between the measurement region M and the second edge B2.

In the three-dimensional shaping device according to the first modification of the present embodiment, when viewed from the Z-axis direction, the outer edge E of the shaping layer L includes the first edge B1 that is in contact with the support layer T and the second edge B2 that is not in contact with the support layer T, and the shortest distance D1 between the measurement region M and the first edge B1 is smaller than the shortest distance D2 between the measurement region M and the second edge B2. Since the first edge B1 is in contact with the support layer T, the heat dissipation property at the first edge B1 is lower than the heat dissipation property at the second edge B2. Therefore, it is possible to measure the temperature of the measurement region M in which the temperature is unlikely to decrease.

When the thermal conductivity of the material forming the support layer T is higher than the thermal conductivity of the material forming the shaping layer L in the first modification, the heat dissipation property at the first edge B1 is higher than the heat dissipation property at the second edge B2. Therefore, the shortest distance D1 between the measurement region M and the first edge B1 is longer than that in the first modification, and the shortest distance D2 between the measurement region M and the second edge B2 is shorter than that in the first modification.

2.2. Second Modification

Figure 10:
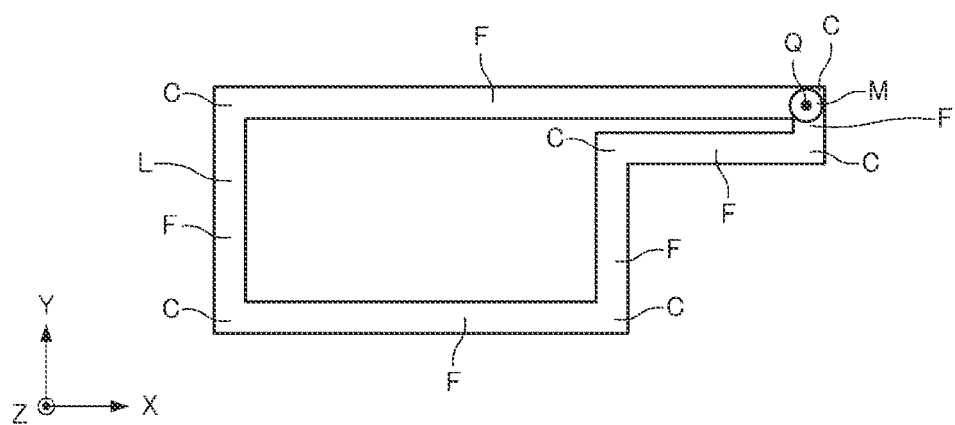
FIG. 10 is a plan view schematically showing a shaping layer formed by a three-dimensional shaping device according to a second modification of the present embodiment.

Next, a three-dimensional shaping device according to a second modification of the present embodiment will be described with reference to the drawings. FIG. 10 is a plan view schematically showing the shaping layer L formed by the three-dimensional shaping device according to the second modification of the present embodiment.

As shown in FIG. 10, the shaping layer L formed by the three-dimensional shaping device according to the second modification of the present embodiment is different from the shaping layer L formed by the three-dimensional shaping device 100 described above in that the interior of the shaping layer L is hollow.

The shaping layer L includes linear portions F having a linear shape and corner portions C which are coupling portions of the two linear portions F when viewed from the Z-axis direction. The measurement region M is provided at the corner portion C of the shaping layer L. When viewed from the Z-axis direction, the relative movement speed between the stage 20 and the head 10 in the measurement region M is smaller than an average of the relative movement speeds between the stage 20 and the head 10 during the formation of the shaping layer L. For example, when the shaping layer L is formed by moving the stage 20 in a state where the head 10 is fixed, the movement speed of the stage 20 when forming the corner portion C is lower than the movement speed of the stage 20 when forming the linear portion F. Accordingly, the corner portion C can be formed with high accuracy.

In the three-dimensional shaping device according to the second modification of the present embodiment, when viewed from the Z-axis direction, the relative movement speed between the stage 20 and the head 10 in the measurement region M is smaller than an average of the relative movement speeds between the stage 20 and the head 10 during the formation of the shaping layer L. Therefore, it is possible to measure the temperature of the measurement region M in which a heat transfer amount from the head 10 is large and the temperature is unlikely to decrease.

2.3. Third Modification

Figure 11:
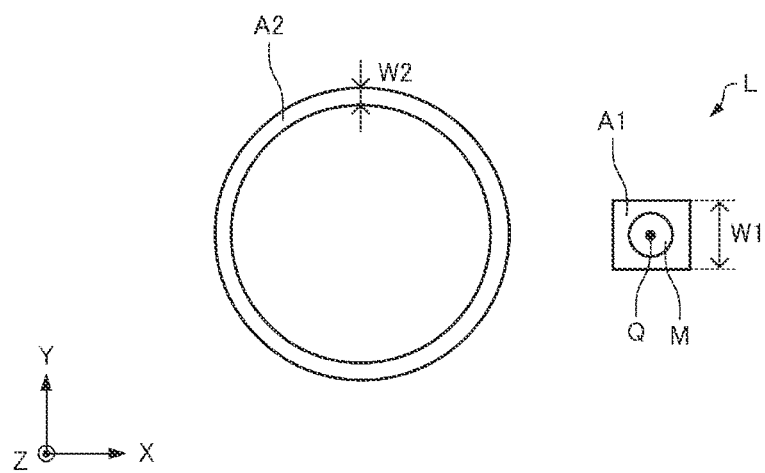
FIG. 11 is a plan view schematically showing a shaping layer formed by a three-dimensional shaping device according to a third modification of the present embodiment.

Next, a three-dimensional shaping device according to a third modification of the present embodiment will be described with reference to the drawings. FIG. 11 is a plan view schematically showing the shaping layer L formed by the three-dimensional shaping device according to the third modification of the present embodiment.

As shown in FIG. 11, the shaping layer L formed by the three-dimensional shaping device according to the third modification of the present embodiment is different from the shaping layer L formed by the three-dimensional shaping device 100 described above in that the shaping layer L includes a first portion A1 and a second portion A2 that are separated from each other.

The first portion A1 has the measurement region M. In the illustrated example, when viewed from the Z-axis direction, a shape of the first portion A1 is a rectangle. A width W1 of the first portion A1 is larger than a spot diameter of the sensor 60. In the illustrated example, the width W1 is a length of a short side.

The second portion A2 does not have the measurement region M. In the illustrated example, a shape of the second portion A2 is a ring shape when viewed from the Z-axis direction. A width W2 of the second portion A2 is smaller than the spot diameter of the sensor 60. Therefore, for example, when the measurement region M is provided in the second portion A2, the temperature of the stage 20 is also measured, and an accurate temperature of the shaping layer L cannot be measured. The width W2 of the second portion A2 is smaller than a diameter of the measurement region M. The width W2 of the second portion A2 is smaller than the width W1 of the first portion A1.

In the shaping layer L formed by the three-dimensional shaping device according to the third modification of the present embodiment, when viewed from the Z-axis direction, the width W1 of the first portion A1 is larger than the width W2 of the second portion A2, and the first portion A1 includes the measurement region M. Therefore, a heat dissipation property of the first portion A1 is lower than a heat dissipation property of the second portion A2. Accordingly, it is possible to measure the temperature of the measurement region M in which the heat dissipation property is low and the temperature is unlikely to decrease.

2.3. Fourth Modification

Next, a three-dimensional shaping device according to a fourth modification of the present embodiment will be described.

In the three-dimensional shaping device 100 described above, the material supplied from the material supply unit 110 is an ABS resin.

In this regard, in the three-dimensional shaping device according to the fourth modification of the present embodiment, the material supplied from the material supply unit 110 is a material other than the ABS resin or a material acquired by adding another component to the ABS resin.

Examples of the material supplied from the material supply unit 110 include materials having various materials such as a thermoplastic material, a metal material, and a ceramic material as main materials. Here, the "main material" means a material serving as a center forming the shape of the shaped object, and means a material having a content of 50% by mass or more in the shaped object. The materials described above include those acquired by melting these main materials alone, and those acquired by melting a part of components contained together with the main materials into a paste form.

As the thermoplastic material, for example, a thermoplastic resin can be used. Examples of the thermoplastic resin include general-purpose engineering plastics and super engineering plastics.

Examples of the general-purpose engineering plastic include polypropylene (PP), polyethylene (PE), polyacetal (POM), polyvinyl chloride (PVC), polyamide (PA), polylactic acid (PLA), polyphenylene sulfide (PPS), polycarbonate (PC), modified polyphenylene ether, polybutylene terephthalate, and polyethylene terephthalate.

Examples of the super engineering plastic include polysulfone (PSU), polyethersulfone (PES), polyphenylene sulfide (PPS), polyarylate (PAR), polyimide (PI), polyamideimide (PAI), polyetherimide (PEI), and polyether ether ketone (PEEK).

In addition to a pigment, a metal and a ceramic, additives such as a wax, a flame retardant, an antioxidant, or a heat stabilizer may be mixed into the thermoplastic material. In the plasticizing unit 120, the thermoplastic material is plasticized and converted into a molten state by rotation of the flat screw 130 and heating of the heater 150. In addition, the shaping material generated in this manner is ejected from the nozzle 160 and then cured by a decrease in temperature. It is desirable that the thermoplastic material is heated to a temperature equal to or higher than the glass transition point thereof and ejected from the nozzle 160 in a state of being completely melted.

In the plasticizing unit 120, for example, a metal material may be used as the main material instead of the thermoplastic material described above. In this case, it is desirable that a component to be melted during generation of the shaping material is mixed into a powder material acquired by converting the metal material into a powder, and then the mixture is fed into the plasticizing unit 120.

Examples of the metal material include a single metal such as magnesium (Mg), iron (Fe), cobalt (Co), chromium (Cr), aluminum (Al), titanium (Ti), copper (Cu), and nickel (Ni), or an alloy containing one or more of these metals, maraging steel, stainless steel, cobalt chromium molybdenum, a titanium alloy, a nickel alloy, an aluminum alloy, a cobalt alloy, and a cobalt chromium alloy.

In the plasticizing unit 120, a ceramic material can be used as the main material instead of the metal material described above. Examples of the ceramic material include an oxide ceramic such as silicon dioxide, titanium dioxide, aluminum oxide, and zirconium oxide, and a non-oxide ceramic such as aluminum nitride.

A powder material of the metal material or the ceramic material supplied from the material supply unit 110 may be a mixed material in which a plurality of types of powder of a single metal or powder of an alloy and powder of a ceramic material are mixed. In addition, the powder material of the metal material or the ceramic material may be coated with, for example, the above-described thermoplastic resin or another thermoplastic resin. In this case, in the plasticizing unit 120, the thermoplastic resin may be melted to exhibit fluidity.

For example, a solvent can be added to the powder material of the metal material or the ceramic material supplied from the material supply unit 110. Examples of the solvent include: water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetate (for example, tetrabutylammonium acetate); and ionic liquids such as butyl carbitol acetate.

In addition, for example, a binder may be added to the powder material of the metal material or the ceramic material supplied from the material supply unit 110. Examples of the binder include an acrylic resin, an epoxy resin, a silicone resin, a cellulose-based resin, other synthetic resins, PLA, PA, PPS, PEEK, and other thermoplastic resins.

The embodiments and the modifications described above are merely examples, and the present disclosure is not limited thereto. For example, the embodiments and the modifications can be combined as appropriate.

The present disclosure includes a configuration substantially the same as the configuration described in the embodiment, for example, a configuration having the same function, method, and result, or a configuration having the same purpose and effect. In addition, the present disclosure includes a configuration acquired by replacing a non-essential portion of the configuration described in the embodiment. In addition, the present disclosure includes a configuration having the same function and effect as the configuration described in the embodiment, or a configuration capable of achieving the same purpose. In addition, the present disclosure includes a configuration in which a known technique is added to the configuration described in the embodiment.

The following contents are derived from the above embodiments and modifications.

One aspect of a three-dimensional shaping device includes:

a stage;

a heater covering a shaping region of the stage and facing the stage;

a head configured to dispense a shaping material toward the stage to form a shaping layer;

a sensor configured to measure a temperature of a measurement region of the shaping layer;

a movement mechanism configured to move the stage and the sensor relative to each other and move the stage and the head relative to each other; and a control unit configured to control the head and the movement mechanism, in which the control unit is configured to execute processing of setting the measurement region based on information on a shape of the shaping layer, causing the sensor to measure a temperature of the measurement region, and controlling the head and the movement mechanism to dispense the shaping material from the head toward the shaping layer when the measured temperature of the measurement region is equal to or lower than a predetermined value.

According to the three-dimensional shaping device, the entire shaping layer can be lowered to a target temperature.

In one aspect of the three-dimensional shaping device, the measurement region may not include an outer edge of the shaping layer when viewed from a perpendicular direction of the shaping region.

According to the three-dimensional shaping device, it is possible to measure the temperature of the measurement region in which the temperature is unlikely to decrease.

In one aspect of the three-dimensional shaping device, the measurement region may include a point at which a shortest distance from an outer edge of the shaping layer is largest when viewed from a perpendicular direction of the shaping region.

According to the three-dimensional shaping device, it is possible to measure the temperature of the measurement region in which the temperature is unlikely to decrease.

In one aspect of the three-dimensional shaping device, the head may be configured to dispense a support material toward the stage to form a support layer that supports the shaping layer, when viewed from a perpendicular direction of the shaping region, an outer edge of the shaping layer may include a first edge that is in contact with the support layer, and a second edge that is not in contact with the support layer, and a shortest distance between the measurement region and the first edge may be smaller than a shortest distance between the measurement region and the second edge.

According to the three-dimensional shaping device, it is possible to measure the temperature of the measurement region in which the temperature is unlikely to decrease.

In one aspect of the three-dimensional shaping device, when viewed from a perpendicular direction of the shaping region, a relative movement speed of the stage and the head in the measurement region may be smaller than an average of relative movement speeds of the stage and the head during formation of the shaping layer.

According to the three-dimensional shaping device, it is possible to measure the temperature of the measurement region in which the temperature is unlikely to decrease.

What is claimed is:

1. A three-dimensional shaping device comprising:
   a stage;
   a heater covering a shaping region of the stage and facing the stage;
   a head configured to:
      dispense a shaping material toward the stage to form a shaping layer; and
      dispense a support material toward the stage to form a support layer that supports the shaping layer, wherein
         first and second outer edges of the shaping layer contact the support layer, and
         third and fourth outer edges of the shaping layer are exposed toward an outside without contacting the support layer;
   a thermal sensor configured to measure a temperature of a measurement region of the shaping layer;
   an actuator configured to move the stage and the thermal sensor relative to each other and move the stage and the head relative to each other;
   a memory configured to store a program; and
   a processor configured to execute the program so as to:
      control the head and the actuator to form the shaping layer and the support layer on the stage;
      set the measurement region based on information of a shape of the shaping layer and the support layer, the measurement region being a point on the shaping layer, the point having a lowest heat dissipation property within the shaping layer, an outer edge of the shaping layer being excluded from the point;
      cause the thermal sensor to measure the temperature of the measurement region;
      determine whether the measured temperature is equal to or lower than a predetermined value, the predetermined value corresponding to a temperature at which the shaping layer is cured;
      control the head and the actuator to dispense the shaping material from the head toward the shaping layer to form another shaping layer on the shaping layer when the processor determines that the measured temperature is equal to or lower than the predetermined value; and
      repeat the measurement of the temperature, the determination of the measured temperature, and the control of the head and the actuator to form a three-dimensional shaped object,
   wherein a thermal conductivity of the support material is equal to or less than a thermal conductivity of the shaping material, and
   the measurement region includes the point at which a first shortest distance from each of the first and second outer edges of the shaping layer is largest in a plan view and at which a second shortest distance from each of the third and fourth outer edges of the shaping layer is largest in the plan view.

2. The three-dimensional shaping device according to claim 1, wherein
   a shortest distance between the point of the measurement region and the first outer edge is smaller than a shortest distance between the point of the measurement region and the third outer edge.

3. The three-dimensional shaping device according to claim 1, wherein
   in the plan view, a relative movement speed of the stage and the head in the measurement region is smaller than an average of relative movement speeds of the stage and the head during formation of the shaping layer.

* * * * *